United States Patent [19]

Hoover et al.

[11] Patent Number: 5,667,012

[45] Date of Patent: Sep. 16, 1997

[54] METHOD AND APPARATUS FOR THE ADDITION OF LOW-BULK-DENSITY FIBERS TO A FLUID

[75] Inventors: Mat Hoover, Richmond; William Ray McIntire, Sugar Land, both of Tex.

[73] Assignee: Schlumberger Technology Corporation, Houston, Tex.

[21] Appl. No.: 540,997

[22] Filed: Oct. 11, 1995

[51] Int. Cl.$^6$ ............................................. E21B 43/267
[52] U.S. Cl. ................................... 166/308; 507/924
[58] Field of Search ...................... 507/924, 909; 366/176.3, 160.4, 182.2; 166/308, 280, 177

[56] References Cited

U.S. PATENT DOCUMENTS

| | | | |
|---|---|---|---|
| 3,256,181 | 6/1966 | Zingg et al. | 507/924 X |
| 5,439,059 | 8/1995 | Harris et al. | 507/924 X |

Primary Examiner—William P. Neuder
Attorney, Agent, or Firm—John E. Vick, Jr.

[57] ABSTRACT

Low density fibrous materials such as carbon fibers are readily added and dispersed into a liquid such as a fracturing fluid liquid by injecting the fibers into the liquid adjacent to the liquid-gas interface at the surface of the liquid. The fibrous materials are preferably compacted to a uniform bulk density in a container in which all the gas in the compacted fibers has been displaced by a liquid. A crimped cartridge having a piston to discharge the compacted fibrous material into the liquid is preferred.

23 Claims, 2 Drawing Sheets

METHOD AND APPARATUS FOR THE ADDITION OF LOW-BULK-DENSITY FIBERS TO A FLUID

This invention relates to the art of mixing, and more particularly, to an apparatus and method for adding relatively large amounts of low-bulk-density fibers such as carbon fibers or synthetic organic fibers to a fluid prior to the pumping of the fiber-laden fluid into a well penetrating a subterranean formation containing fluids of value.

BACKGROUND OF THE INVENTION

In the art of hydrocarbon recovery from subterranean formations, it is common to pump fluids through a wellbore in order to place materials in, adjacent to or extending from the wellbore. Thus, gravel is commonly placed in a near-wellbore zone in a so-called gravel pack in order to form a porous matrix through which formation fluids may be produced but which will act as a filter medium for the separation of fine formation solid materials from the fluid stream. It is also common to hydraulically fracture the rock formation adjacent the wellbore to cause radially-oriented cracks to be developed. Such fracturing operations are commonly carried out using a viscosified fluid in which solid particulate proppant materials such as sand, sintered bauxite, walnut shells, and the like, are suspended which will remain in the created fracture once fracturing pressure has been released, thereby forming a high permeability channel through which formation fluids may easily pass into the wellbore for recovery.

U.S. Pat. No. 5,330,005, describes an improved process whereby fibers are incorporated into a gravel packing or fracturing fluid so that the fibers will be intimately mixed with and deposited with the gravel or proppant materials to stabilize the gravel or proppant pack against flowback into the well due to fluid flow velocity action during fluid production from the well. The fibers used in these processes may comprise virtually any fibrous material such as glass, carbon, synthetic or metallic fibers or mixtures thereof. With glass, metal and some synthetic fibers, mixing the fibers into a viscosified carrier fluid presents little difficulty since such materials typically have a bulk density much greater than water, are generally supplied in small bundles or packets called "tows" containing several fibers which are easily wet by water and which are easily dispersed in an aqueous fluid.

Glass fibers have found use in many gravel packing and fracturing applications and are usually preferred due to their relatively low cost, their availability in relatively easily transportable bulk form and their ready availability. However, because of chemical or combined chemical and temperature interaction with certain formation and well treatment fluids such as strong acids or strongly basic fluids, a more durable, more chemically resistant fiber such as a synthetic organic or a carbon fiber must be used. With some carbon and some synthetic fibers, however, their low bulk density and low water wettability do not allow them to be easily dispersed into an aqueous treatment fluid so that they can be placed with a gravel pack or fracture proppant pack. The low bulk density also makes dry mixing the carbon fibers with proppant or gravel packing materials having much higher densities subject to segregation during transport. This density segregation is further aggravated in dry transfer operations. Furthermore, the problem of wetting and dispersion of the fibers in the fluid prior to pumping remains.

SUMMARY OF THE INVENTION

The present invention provides an apparatus and method for the introduction and dispersion of fibrous materials into a liquid which overcomes the prior difficulties of wettability and floatation of these fibers in previous processes of introduction and dispersion.

In accordance with the invention, a method of introducing and dispersing a fibrous material into a liquid comprises the steps of providing a container for the liquid which has a liquid-gas interface, positioning a container for the fibrous material so that a discharge opening in the container for the fibrous material is located in the liquid container, near or below the liquid-gas interface and ejecting the fibrous material from the container for the fibrous material through the discharge opening and into the liquid below the liquid-gas interface.

Further in accordance with the invention, the fibrous materials are compacted within the container for the fibrous material prior to positioning the container in the liquid or closely adjacent to the liquid-gas interface.

Still further in accordance with the invention, the gas within the compacted fibrous material is displaced from the fibrous material container, preferably by a liquid, more preferably by an aqueous liquid and most preferably by an aqueous liquid which includes a surfactant.

In yet another aspect of the invention, an apparatus for dispersing a fibrous material into a liquid comprises a liquid container having a liquid-gas interface and a fibrous material container having a discharge opening and which is positionable within the liquid container so that the discharge opening is located in close proximity to or below the liquid-gas interface of the liquid container.

Still further in accordance with the invention, the above apparatus includes mixing and agitation means.

It is therefore an object of this invention to provide a means and method of adding and dispersing a fibrous material, particularly a low-bulk density fibrous material such as carbon fibers into a liquid which may then be pumped into a subterranean formation.

It is another object of this invention to provide an apparatus and method for adding low-bulk density fibrous materials to a liquid in a continuous mix process without substantial variation from the desired level of fibrous material dispersed in the liquid over an extended period of time.

BRIEF DESCRIPTION OF THE DRAWINGS

These and other objects of the invention are accomplished through the manner and form of the present invention to be described hereinafter and in conjunction with the accompanying drawings forming a part of this specification and in which.

DETAILED DESCRIPTION OF THE PREFERRED EMBODIMENTS AND THE DRAWINGS

The invention will now be described in the more limited form of an illustrative preferred embodiment depicting the broad concepts of the invention in conjunction with specific apparatus and process steps related to that apparatus. It will be understood by those skilled in the art that other embodiments of these concepts are possible using other types of apparatus and that the following description should not be taken in any way as a limitation upon the concepts illustrated thereby.

Figure 2:
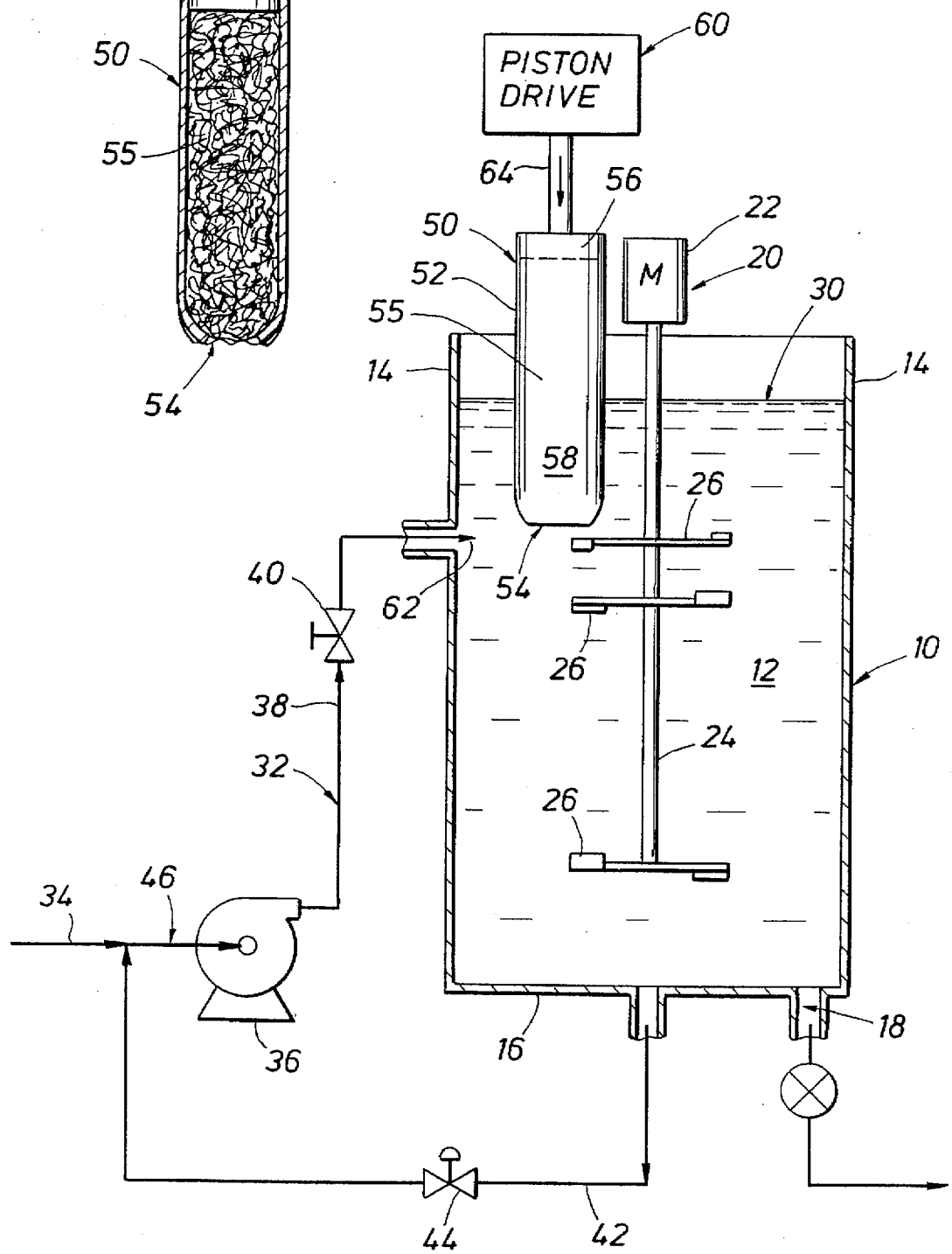
FIG. 2 is a schematic cross sectional view of the cartridge of FIG. 1 shown in position in a mixing apparatus and which illustrates alternative process modifications in which a preferred embodiment of the present invention may be applied.

In accordance with one preferred embodiment of the invention, a fibrous material is injected into a mixing vessel 10 as shown in FIG. 2. The mixing vessel 10 may be of any shape such as cylindrical or rectangular box-shaped, as may be conveniently chosen by the artisan. A fluid 12 is contained within the vessel 10, which fluid may comprise water, hydrocarbon fluid or either of these fluids containing a thickening agent such as a galactomannan gum, synthetic polymer or viscoelastic surfactant. The preferred mixing vessel shown in FIG. 2 has an open top, vertical side walls 14, an enclosed base 16 and a discharge opening 18. A liquid agitator comprising a mixer 20 is positioned generally centrally within the vessel 10 and includes a motor 22 which may be electrically or, preferably hydraulically driven to rotate the shaft 24 and at least one rotary impeller 26 situated thereon for rotation and agitation of the fluid 12 within in the vessel 10. A liquid-gas interface 30 is located in the upper portion of vessel 10 at the upper level of the liquid 12. The gas above the liquid-gas interface 30 is typically air but, optionally may be nitrogen, inert gas or any other gas desired by an operator. Obviously, if the gas is other than air, an enclosed gas space above the liquid-gas interface 30 must be provided.

A liquid feed system 32 comprises a liquid feed line 34 supplying liquid from a source (not shown) to a pump 36 having a discharge conduit 38 leading tot he interior of the vessel 10. A valve 40 may be positioned along the discharge conduit 38 to control the flow of fluid into the vessel 10. A recirculation conduit 42 including a valve 44 may be optionally provided to allow recirculation of the fluid 12 within the vessel 10 to the liquid feed line 34. Also optionally, at least one additive feed line 46 may be provided, as needed, to add additional materials to the liquid feed line 34.

In accordance with the invention, a fiber additive feed cartridge 50 is positioned so that at least a portion of its side wall 52a penetrates the liquid-gas interface 30 and so that its discharge opening 54 is completely immersed in the liquid 12.

Figure 1:
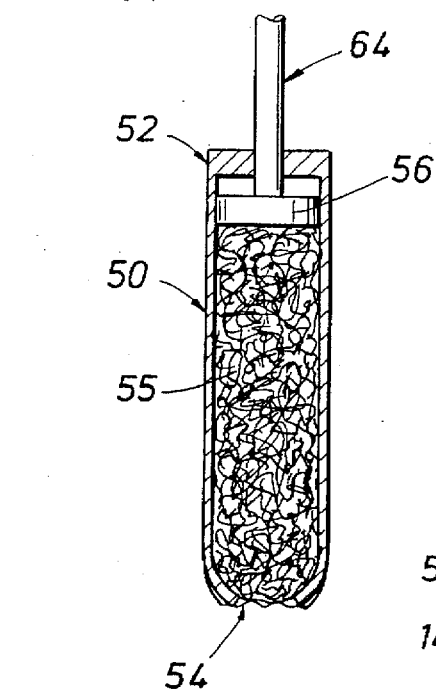
FIG. 1 is a schematic cross sectional view of one preferred form of fiber-containing cartridge which may be used in accordance with one embodiment of the invention.

As seen in FIG. 1, the fiber additive feed cartridge 50 comprises a generally cylindrical side wall 52 having at one end a discharge opening 54. The discharge opening 54 is preferably closed off with some form of cap or, as shown in the drawing as the preferred form, crimped in the manner of a shotgun shell. The cartridge 50 may be made of any material such as treated paper or cardboard, ductile metal or, preferably, a plastic material such as polyethylene or other convenient polymer.

The cartridge 50 also includes a piston member 56 blocking off the end of the cartridge 50 opposite its discharge opening 54 which is capable of longitudinal movement within the cartridge 50. The piston member 56 and the discharge opening 54 define an enclosed chamber 58 within the cartridge 50. In accordance with the invention, the enclosed chamber 58 is packed with the fiber of preference, such as a low density synthetic fiber or carbon fiber, for addition to the liquid 12 in the mixing vessel 10. It will be understood that even though the fibers of preference are compacted within the cartridge 50, there remains some volume of space within the chamber 58 which is void of fiber and contains a gas such as air which itself may be undesirable in the mixing process. Thus, in accordance with a preferred embodiment of this invention, a surfactant material may be applied to the fibers so that they are easily water-wet allowing the associated gas to release from the fiber surface and escape upon addition tot he liquid. In another preferred embodiment, the void space within the chamber 58 is filled with a liquid to displace any gaseous material otherwise existing therewithin. This displacement liquid may be any liquid which is compatible with the liquid into which the fibers are to be mixed, such as water or water containing a thickening agent, a dispersing agent, a wetting agent or other surfactant material which may aid in the mixing and dispersal of the fibers.

Figure 3:
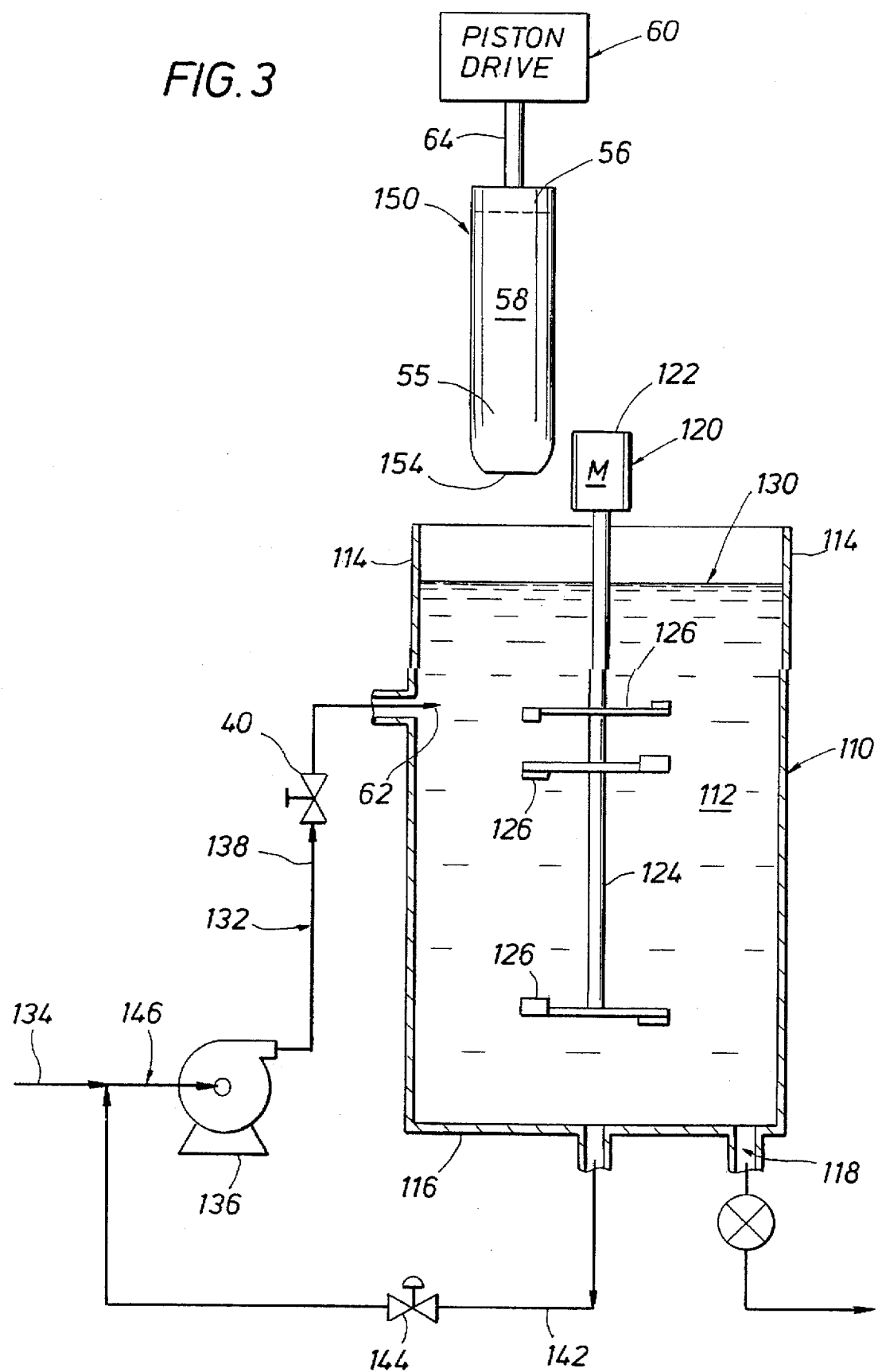
FIG. 3 is a schematic cross sectional view of the cartridge of FIG. 1 shown in an alternative position in a mixing apparatus and which illustrates alternative process modifications in which a preferred embodiment of the present invention may be applied.

In accordance with another preferred embodiment of the invention, a fibrous material is injected into a mixing vessel 110 as shown in FIG. 3. The mixing vessel 110 is configured substantially the same as that shown in FIG. 2, being of any shape such as cylindrical or rectangular box-shaped, as may be conveniently chosen by the artisan. A fluid 112 is contained within the vessel 110, which fluid may comprise water, hydrocarbon fluid or either of these fluids containing a thickening agent such as a galactomannan gum, synthetic polymer or viscoelastic surfactant. The preferred mixing vessel shown in FIG. 3 has an open top, vertical side walls 114, an enclosed base 116 and a discharge opening 118. A liquid agitator comprising a mixer 120 is positioned generally centrally within the vessel 110 and includes a motor 122 which may be electrically or, preferably hydraulically driven to rotate the shaft 124 and at least one rotary impeller 126 situated thereon for rotation and agitation of the fluid 112 within in the vessel 110. A liquid-gas interface 130 is located in the upper portion of vessel 110 at the upper level of the liquid 112. The gas above the liquid-gas interface 130 is typically air but, optionally may be nitrogen, inert gas or any other gas desired by an operator. Obviously, if the gas is other than air, an enclosed gas space above the liquid-gas interface 130 must be provided.

A liquid feed system 132 comprises a liquid feed line 134 supplying liquid from a source (not shown) to a pump 136 having a discharge conduit 138 leading tot he interior of the vessel 110. A valve 140 may be positioned along the discharge conduit 138 to control the flow of fluid into the vessel 110. A recirculation conduit 142 including a valve 144 may be optionally provided to allow recirculation of the fluid 112 within the vessel 110 to the liquid feed line 134. Also optionally, at least one additive feed line 146 may be provided, as needed, to add additional materials to the liquid feed line 134.

In accordance with a second preferred embodiment of the invention, a fiber additive feed cartridge 150 is positioned so that its discharge opening 154 is slightly above the liquid 112. When compacted fibers are discharged from a feed cartridge, it has been found that the fiber mass expands radially outwardly. It is the desire of the present embodiment of the invention that the majority of this expansion take place within the liquid, i.e., below the liquid-gas interface 130. It has been found that to effect the desired dispersal of the fibers in the liquid and to locate the expansion of the fibers within the liquid, the cartridge must be positioned at a distance of less than five, preferably less than three and most preferably less than one cartridge diameter d above the liquid-gas interface 130.

In accordance with the method of the invention, the fluid 12 (FIG. 1) contained in the mixing vessel 10 is agitated by the mixer 20. The fiber additive feed cartridge 50 is positioned so that its discharge opening 54 is immersed into the liquid 12 below the gas-liquid interface 30 as shown in FIG. 2 or within five cartridge diameters above the liquid-gas interface 130 as shown in FIG. 3. A piston drive means 60 is then activated to move in the direction of arrow A against the piston member 56 to force the fiber pack 55 outwardly through the discharge opening 54 of the fiber additive feed cartridge 50 such as by forcing open the crimped end or ejecting any cap thereon which may be provided. The piston drive means 60 may comprise any means which will apply a discharging force to a ram 64 acting on the piston member 56 such as a mechanical drive or a hydraulic or pneumatic pressure ram drive. The fibers are compressed in the cylinder to a uniform bulk density. Therefore, a given linear movement of the piston member 56 will result in a corresponding, predictable volume and mass of fibers being injected into the fluid. Controlling the rate of piston movement controls the mass addition rate of the fibers.

As the fiber 55 exits the cartridge 50 through the discharge opening 56, the fiber mass expands radially outwardly and shear forces of the circulating liquid 12 may be sufficient to separate individual fibers or small groups of fibers from the fiber pack 55. However, in accordance with a preferred embodiment of the invention, the shearing of individual or small groups of fibers from the fiber pack 55 is aided by the force of fluid entering the mixing vessel 10 from the liquid feed system 32 by positioning an inlet jet 62 on the discharge conduit 38 so that flow of fluid therefrom passes generally directly through the discharged fiber pack 55 to add additional shearing force to the fiber pack 55 which aids in the separation of individual or small groups of fibers from the fiber pack 55 to be dispersed in the fluid 12 by the mixer 20. In another embodiment, at least one of the impellers 26 may comprise a cutting bar which is positioned within the mixing vessel such that in its rotary motion, it cuts through the discharged fibers 55 to disperse them within the fluid 12.

When the dispersed fibers in the fluid 12 have reached the appropriate concentration level, fluid containing the fibers may be withdrawn, as needed, from the mixing vessel 10 through discharge opening 18 and pumped to other processing equipment for further additions, increased pressure, etc., or pumped directly into a well penetrating a subterranean formation. In a continuous-mix application, two or more piston drive mechanisms my be employed. While fibers are metered into the fluid by one mechanism, the emptied fiber cartridge can be removed and replaced by a full cartridge. By alternating feed between the drive mechanisms, a continuous, controlled fiber feed rate can be achieved.

While the invention has been described in the more limited aspects of preferred embodiments thereof, other embodiments have been suggested and still others will occur to those skilled in the art upon a reading and understanding of the foregoing specification. It is intended that all such embodiments be included within the scope of this invention as limited only by the appended claims.

Having thus described our invention, we claim:

1. A method of addition and dispersion of a fibrous material into a liquid comprising the steps of providing a liquid having a liquid-gas interface and injecting the fibrous material into the liquid adjacent to the liquid-gas interface, wherein the step of injecting comprises providing a container having a diameter which contains the fibrous material and positioning the container for the fibrous material below the liquid-gas interface.

2. A method of addition and dispersion of a fibrous material into a liquid comprising the steps of providing a liquid having a liquid-gas interface and injecting the fibrous material into the liquid adjacent to the liquid-gas interface wherein the step of injecting comprises providing a container having a diameter which contains the fibrous material and positioning the container for the fibrous material less than five container diameters above the liquid-gas interface.

3. A method of addition and dispersion of a fibrous material into a liquid comprising the steps of providing a liquid having a liquid-gas interface and injecting the fibrous material into the liquid adjacent to the liquid-gas interface wherein the step of injecting comprises providing a container having a diameter which contains the fibrous material and positioning the container for the fibrous material less than three container diameters above the liquid-gas interface.

4. A method of addition and dispersion of a fibrous material into a liquid comprising the steps of providing a liquid having a liquid-gas interface and injecting the fibrous material into the liquid adjacent to the liquid-gas interface wherein the step of injecting comprises providing a container having a diameter which contains the fibrous material and positioning the container for the fibrous material less than one container diameter above the liquid-gas interface.

5. A method of addition and dispersion of a fibrous material into a liquid comprising the steps of:

(1) providing a liquid having a liquid-gas interface, (2) compacting a fibrous material to a uniform bulk density within a container, (3) positioning the container adjacent to the liquid-gas interface, (4) injecting the fibrous material into the liquid adjacent the liquid-gas interface, (5) ejecting the fibrous material at a volumetric rate.

6. The method as set forth in claim 5 further including removing substantially all gas from the container prior to the step of injecting.

7. The method as set forth in claim 6 wherein the step of removing gas comprises displacing the gas within the container with a liquid.

8. The method as set forth in claim 6 wherein the step of removing gas comprises displacing the gas within the container with an aqueous liquid.

9. The method as set forth in claim 6 wherein the step of removing gas comprises displacing the gas within the container with an aqueous liquid containing a surfactant.

10. The method as set forth in claim 5 wherein the step of ejecting the fibrous material from the container comprises mechanically pushing the fibrous material from the container.

11. The method as set forth in claim 5 wherein the step of ejecting the fibrous material comprises hydraulically delivering the fibrous material from the container.

12. The method as set forth in claim 5 wherein the step of ejecting the fibrous material from the container comprises pneumatically pushing the fibrous material from the container.

13. A fracturing fluid made by a process of addition and dispersion of a fibrous material into a liquid comprising the steps of:

(1) providing a liquid having a liquid-gas interface, (2) injecting a fibrous material into the liquid adjacent the liquid-gas interface, and (3) agitating the liquid during the step of injecting.

14. The fracturing fluid of claim 13 further including:

compacting the fibrous material to a uniform bulk density within a container prior to the injecting step, and further wherein the injecting step comprises inserting at least a portion of the container into the liquid adjacent to the liquid-gas interface followed by ejecting the fibrous material from the container into the liquid.

15. Apparatus for adding a fibrous material to a liquid comprising:
   (1) a mixing tank for the liquid which provides a liquid-gas interface, the mixing tank having a liquid agitator, further wherein a liquid jet is located below the liquid-gas interface;
   (2) a container for the fibrous material positionable within the mixing tank, the container having a discharge opening located adjacent to the liquid-gas interface when in position in the mixing tank, and
   (3) means for discharging the fibrous material from the container through the discharge opening into the mixing tank.

16. The apparatus as set forth in claim 15 wherein the container for the fibrous material comprises a cylindrical cartridge.

17. The apparatus as set forth in claim 16 wherein the discharge opening of the cylindrical cartridge is crimped prior to discharge.

18. The apparatus as set forth in claim 16 wherein the means for discharging the fibrous material comprises a piston within the cylindrical cartridge.

19. The apparatus as set forth in claim 18 further including a mechanical piston rod acting on the piston.

20. The apparatus as set forth in claim 18 further including a hydraulic ram acting on the piston.

21. The apparatus as set forth in claim 18 further including a pneumatic ram acting on the piston.

22. The apparatus as set forth in claim 16 wherein the mixing tank includes a mechanical mixer located below the liquid-gas interface and adjacent the discharge opening of the container for the fibrous material when in position within the mixing tank.

23. The apparatus as set forth in claim 22 wherein the mechanical mixer comprises a rotating cutting bar.

* * * * *